United States Patent Office 3,149,957
Patented Sept. 22, 1964

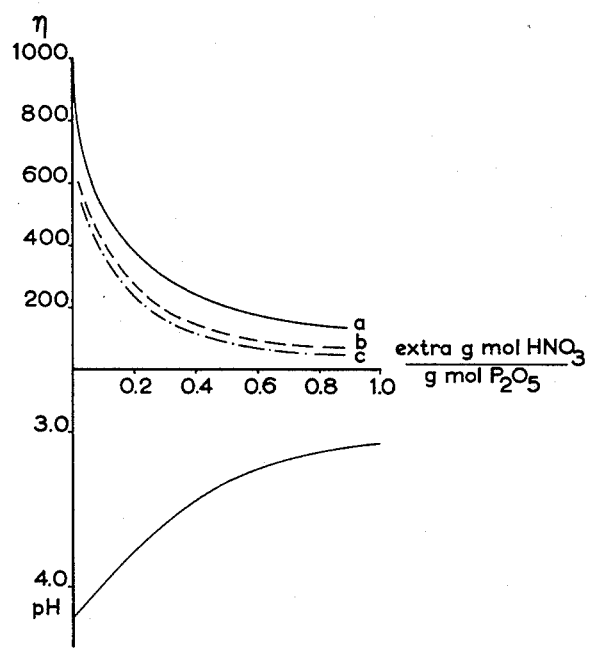

3,149,957
PREPARATION OF A GRANULAR COMPOUND
FERTILIZER CONTAINING N, P AND K
Willem Slot, Geleen, Netherlands, assignor to
Stamicarbon N.V. Heerlen, Netherlands
Filed Aug. 29, 1961, Ser. No. 134,604
Claims priority, application Netherlands, Sept. 2, 1960,
255,547
2 Claims. (Cl. 71—39)

Commercially available are fertilizer grains containing N and P, the said fertilizer grains being obtained by successively decomposing phosphate rock with nitric acid, adjusting the molar $CaO/P_2O_5$ ratio in the resulting decomposition liquor to less than or equal to 2, by removing calcium nitrate through cooling or by addition of phosphoric acid, partially neutralizing the said liquor with $NH_3$ in a continuous process at a pH below 2.5 with simultaneous formation of a suspension of $CaHPO_4$ in a solution containing essentially ammonium nitrate, evaporating the said suspension into a melt with a moisture content of 2–4%, and granulating the said melt preferably by spraying it into droplets of appr. 1–2 mm. diameter, which droplets, during their fall through a tower, cool down and solidify to yield smooth grains of uniform diameter, the so-called prills.

If now, by addition of the required amount of potassium salt, preferably $K_2SO_4$, to the abovementioned melt, it is tried to produce a compound fertilizer containing N, P and K by the same procedure, the mass becomes very viscous and, in consequence, very difficult to pump up to the top of a normal prilling tower. When dealing with such a viscous mass, granulating has to be done with other methods, such as feeding the melt into granulating drums together with previously screened off solid product.

A product granulated in this way is much inferior in shape to fertilizer grains obtained by prilling.

Now it was found that a surprisingly low viscosity can be reached—with the result that the fertilizer becomes again easy to pump and easy to prill—if the pH of the mass is adjusted to a value of <4 measured upon dilution of 100 l. of fertilizer melt per 100 l. of water. For example, a fertilizer melt of the composition 14% N–14% $P_2O_5$–14% $K_2O$, with a pH value of 4.2 and a moisture content of 4.5%, prepared by the above procedure, has a viscosity of over 1000 cp.

Addition of 1.8% by weight of 55% nitric acid caused the viscosity to fall below 300 cp. and the pH to 3.9. The pH of the fertilizer melt to be pumped and sprayed can be brought at <4 in various ways, for example by supplying a small amount of strong acid after the addition of the potassium salt or by supplying a small amount of strong acid before the addition of the potassium salt or by a less far neutralization of the decomposition liquor.

The effect of the acid addition on the viscosity of the melt proves to be greatest if the acid is added after the potassium salt, as appears from the graph, which shows the relation between the viscosity of a fertilizer melt of the composition 14% N, 14% $P_2O_5$, 14% $K_2O$ and the amount of extra acid added in gmol per gmol $P_2O_5$. The graph also shows the relationship between the pH as measured upon a 1:1 dilution with water and the extra amount of acid added.

The curves a, b and c in the graph relate to the cases where:

(a) Acid is added before the addition of the potassium salt, and the moisture content upon addition of the potassium salt amount to 4%,
(b) Acid is added after the potassium salt, and the moisture content upon addition of the potassium salt amounts to 4%,
(c) The same procedure is followed as under (b), but the moisture content amounts to 5.2%.

The method according to the invention can be used with particular advantage if potassium sulphate is used as the potassium salt, because in that case fertilizer melts with a lower viscosity are obtained than in the event the potassium is added in the form of potassium sulphate. In the application of the process according to the invention the pH of the melt to be prilled will generally not be allowed to drop below 3 (measured upon a 1:1 dilution with water), since otherwise the fertilizer prill will, as a result of the acid reaction, unduly attack the packing material, with the consequence that difficulties are experienced during transport.

The following numerical examples may serve to elucidate the invention.

*Example 1*

1000 g. of phosphate rock mixture (51% CaO, 36% $P_2O_5$, 3.4% F) were decomposed with 2580 g. of 55% $HNO_3$. 1350 g. $Ca(NO_3)_2 4H_2O$ were crystallized out of the solution by cooling and removed, after which the solution (mol $CaO/P_2O_5=1.34$) was continuously neutralized with 231 g. of $NH_3$ at a pH=2.5. During this operation 250 g. of water escaped as water vapour, after which another 300 g. of water were removed by continued evaporation. Next, 735 g. of potassium sulphate (49% $K_2O$) technical grade were added. In this way 2526 g. of fertilizer melt with a moisture content of 4% were obtained; the pH was 4.2 (measured upon a 1:1 dilution with water). The melt was hard to pump and would have to be granulated in a granulating drum. Extra addition of 88 g. 55% $HNO_3$ (i.e. 0.3 mol $HNO_3$ per mol $P_2O_5$) turned the melt into a thin fluid (the pH, measured upon a 1:1 dilution with water was 3.6), which was easy to pump and, in consequence, easy to prill. The prills were subjected to a secondary drying treatment in a rotary drier until the moisture content was 1% and powdered with 3% kieselguhr. The prills contained 13.8% N, 14.0% $P_2O_5$, 50% of which was water soluble and 14.0% $K_2O$.

*Example 2*

1000 g. of phosphate rock mixture (51.0% CaO, 36% $P_2O_5$ and 3.4% F) were decomposed with 2830 g. of 55% $HNO_3$, after which 1350 g. of $Ca(NO_3)_2 4H_2O$ were crystallized out by cooling. Upon filtration, the solution was continuously neutralized with 270 g. $NH_3$ at a pH=2.5. During this operation 300 g. of water evaporated; another 490 g. of water were removed by continued evaporation whereafter to the resulting suspension of solid $CaHPO_4$ in a solution substantially containing ammonium nitrate 1080 g. of $K_2SO_4$ (50% $K_2O$) were added. To reduce the viscosity of the resulting mass 237 g. of 55% $HNO_3$, i.e. 0.8 gmol/gmol $P_2O_5$, were added. The fertilizer mass (water content 5.1%, pH 3.2 measured upon a 1:1 dilution with water) were processed into prills, which were subjected to a secondary drying treatment until the moisture content was 1% and powdered with 2% kieselguhr. The resulting fertilizer contained 13.8% N, 11.4% $P_2O_5$ 75% of which was water soluble, and 17.1% $K_2O$.

I claim:

1. In a process for the production of a granular mixed fertilizer containing N, P and K, comprising the steps of: decomposing phosphate rock with nitric acid; correcting the molar $CaO/P_2O_5$ ratio in the resulting acidic liquor to a value no greater than 2; continuously neutralizing the acidic liquor with $NH_3$ to obtain a suspension of dicalcium phosphate in a solution of ammonium nitrate having a pH below 2.5; converting this suspension into a melt by evaporation; adding a potassium salt to the melt which would provide a melt having a pH greater than 4 and converting the potassium melt into fertilizer prills, the improvement comprising adding nitric acid to the melt to obtain a final melt pH value of less than 4, the pH being measured upon dilution of 1 part by volume of the melt per 1 part by volume of water.

2. In the process of claim 1, the improvement comprising adding the acid to the melt to decrease the pH to less than 4 after the potassium salt has been added to the melt.

References Cited in the file of this patent

UNITED STATES PATENTS

| | | |
|---|---|---|
| 1,876,501 | Johnson | Sept. 6, 1932 |
| 2,766,107 | White | Oct. 9, 1956 |
| 2,936,228 | Van Den Berg | May 10, 1960 |
| 2,948,602 | Revallier et al. | Aug. 9, 1960 |

FOREIGN PATENTS

| | | |
|---|---|---|
| 430,380 | Great Britain | June 18, 1935 |
| 692,251 | Great Britain | June 3, 1953 |
| 692,252 | Great Britain | June 3, 1953 |
| 692,253 | Great Britain | June 3, 1953 |

UNITED STATES PATENT OFFICE
CERTIFICATE OF CORRECTION

Patent No. 3,149,957                                          September 22, 1964

Willem Slot

It is hereby certified that error appears in the above numbered patent requiring correction and that the said Letters Patent should read as corrected below.

Column 2, line 16, for "sulphate" read -- chloride --; column 3, line 17, after "potassium" insert -- salt containing --.

Signed and sealed this 19th day of January 1965.

(SEAL)
Attest:

ERNEST W. SWIDER                                    EDWARD J. BRENNER
Attesting Officer                                          Commissioner of Patents